US006855250B2

(12) United States Patent
Nixdorf

(10) Patent No.: US 6,855,250 B2
(45) Date of Patent: Feb. 15, 2005

(54) FILTER SYSTEM EMPLOYING MICROWAVE REGENERATION

(75) Inventor: Richard D. Nixdorf, Knoxville, TN (US)

(73) Assignee: Industrial Ceramics Solutions, Oak Ridge, TN (US)

( * ) Notice: Subject to any disclaimer, the term of this patent is extended or adjusted under 35 U.S.C. 154(b) by 106 days.

(21) Appl. No.: 10/437,342

(22) Filed: May 13, 2003

(65) Prior Publication Data

US 2003/0230059 A1 Dec. 18, 2003

Related U.S. Application Data

(60) Provisional application No. 60/378,023, filed on May 13, 2002.

(51) Int. Cl.[7] .............................................. B01D 15/08
(52) U.S. Cl. ........................ 210/180; 210/184; 210/186; 210/407; 55/282.3; 55/523
(58) Field of Search ................................. 210/180, 184, 210/185, 186, 769, 340, 341, 493.1, 493.3, 407; 55/282.3, 523

(56) References Cited

U.S. PATENT DOCUMENTS

| 4,367,150 A | * | 1/1983 | Hiesinger et al. ........... 210/777 |
| 4,631,133 A | | 12/1986 | Axelrod ....................... 210/739 |
| 4,998,972 A | * | 3/1991 | Chin et al. ................... 600/109 |
| 5,075,160 A | | 12/1991 | Stinton et al. .............. 428/282 |
| 5,147,546 A | * | 9/1992 | Tadayon ...................... 210/506 |
| 5,447,630 A | * | 9/1995 | Rummler ..................... 210/186 |
| 5,512,172 A | | 4/1996 | Marble ........................ 210/232 |
| 5,531,892 A | | 7/1996 | Duffy ....................... 210/493.1 |
| 5,609,761 A | | 3/1997 | Franz ....................... 210/493.1 |
| 5,705,071 A | | 1/1998 | Morris ...................... 210/493.1 |
| 5,725,762 A | | 3/1998 | Beal et al. ................... 210/181 |
| 5,833,725 A | | 11/1998 | Dehn et al. .................... 55/302 |
| 5,843,304 A | * | 12/1998 | Marchesseault et al. .... 210/143 |
| 5,853,579 A | | 12/1998 | Rummler et al. ........... 210/170 |
| 5,885,455 A | | 3/1999 | Graus et al. ................ 210/445 |
| 6,132,600 A | * | 10/2000 | Marchesseault et al. .... 210/143 |
| 6,156,192 A | * | 12/2000 | Rummler ..................... 210/153 |
| 6,264,045 B1 | | 7/2001 | Wilson et al. .............. 210/491 |
| 6,361,693 B1 | | 3/2002 | Park ....................... 210/321.89 |
| 6,379,407 B1 | * | 4/2002 | Blackwell et al. ......... 55/282.3 |
| 6,517,711 B1 | * | 2/2003 | Rummler et al. ........... 210/185 |
| 2003/0209488 A1 | * | 11/2003 | Nixdorf ....................... 210/508 |

* cited by examiner

*Primary Examiner*—Ernest G. Therkorn
(74) *Attorney, Agent, or Firm*—Pitts & Brittian, P.C.

(57) ABSTRACT

A filtration system (10) operable at elevated temperatures and regenerateable in situ employing microwave energy (99). In one embodiment, the system includes multiple channels (35) with means for selectively placing individual ones of the channels on-line for filtration and off-line for regeneration.

5 Claims, 6 Drawing Sheets

FILTER SYSTEM EMPLOYING MICROWAVE REGENERATION

CROSS-REFERENCE TO RELATED APPLICATIONS

This application is a non-provisional application claiming priority based on provisional application Ser. No. 60/378,023, filed May 13, 2002.

STATEMENT REGARDING FEDERALLY SPONSORED RESEARCH OR DEVELOPMENT

This invention was made with Government support under Subcontract No. 4000000723 funded by the Government. The Government has certain rights in the invention.

BACKGROUND OF THE INVENTION

1. Field of Invention

This invention relates to filters and filter systems which are operable at elevated temperatures and capable of extracting volatilizable particulates from a gas stream. In particular, this invention relates to ceramic fiber-paper based filters which may be regenerated in situ employing microwave energy.

2. Background of the Invention

Heretofore, it has been known in the art that ceramic fibers may be formed into a ceramic paper. It is also suggested in the prior art that this paper may be corrugated and wound into a cylindrical filter for the capture of volatilizable particulates from a gas stream, and that the filter may be regenerated employing microwaves.

However, these prior art filters and/or the systems within which they are employed suffer from problems of premature clogging of the entry ends of the tubular chambers defined by the corrugations, and from inadequate capacity to accommodate the anticipated or actual overall flow of gas streams through the filter, resulting in excessive pressure drop across the filter, at times creating undesirable or even disastrous results, and/or regeneration only during shut-down or diversion of the source of the gas stream, such diversion effectively taking the filtration system offline.

BRIEF SUMMARY OF THE INVENTION

In accordance with one aspect of the present invention, there is provided at least one filter module comprising a housing which defines an inlet and an outlet for the passage of a gas stream into and out of the housing. Within the housing there is disposed a pleated ceramic fiber-based filter medium which separates the interior of the housing into at least two filtration chambers, one of which is in fluid communication with the inlet to the housing and a second one of which is in fluid communication with the outlet of the housing. As desired, multiple further filtration chambers may be interposed in fluid flow communication between the "inlet" chamber and the "outlet" chamber. A gas stream entering the inlet chamber passes through the multiple pleats of the filter medium of each chamber wherein particulates are extracted from the gas stream and accumulate on the filter medium. The filtered air stream passes through the outlet chamber and any intervening chamber, and exits the housing through the outlet thereof. As desired, the inlet and/or the inlet to the housing may be in the form of a plenum extending along one side of the housing.

In accordance with a further aspect of the invention, there is provided an outlet plenum which extends along the outlet side of the housing (opposite the inlet side). In one embodiment, this plenum serves the dual function of a pathway for conveying away the exhaust gas stream from the filter and as a selectable pathway for the transmission of microwaves into the filter housing.

In one embodiment, the overall filter structure comprises at least one, and preferably a plurality of individual housing/pleated filter subassemblies, all aligned in a common plane or parallel planes so that their respective outlet sides are aligned such that they share a common elongated exhaust plenum. Within, and concentrically of, the interior of this exhaust plenum there is provided a rotatable, preferably tubular, member. This member includes a plurality (one for each filter subassembly or grouping of filter subassemblies) of ceramic microwave-permeable segments spaced apart from one another along the length of the wall of the tubular member. The remainder of the tube includes holes of a proper diameter to stop 2.45 GH microwaves while allowing the free passage of exhaust gas therethrough. Thus, each segment is sized and designed to cover a respective one or ones of the outlets of the aligned outlets of the multiple subassemblies to define a transparent window for the admission of microwaves (while preventing the flow of exhaust gas therepast), but stopping exhaust flow, passing along the length of the tubular member, into a respective one or ones of the filter subassemblies when the segment is in register with the outlet from a respective filter subassembly. In this embodiment, each segment also is positioned at a location which is progressively rotated about the outer circumferential wall of the tubular member. In one embodiment, no two filter subassemblies are open to microwaves at any given time. In other embodiments, only a limited number of filter subassemblies are open to microwaves at any given time Thus, through selective rotation of the tubular member about its longitudinal axis, admission of microwaves into a filter subassembly may be restricted to only a single filter subassembly or a selected group of filter subassemblies, at any given time, thereby providing for the regeneration of a single filter subassembly or selected group of filter subassemblies while the remaining filter subassemblies remain available for receiving and filtering of the inlet gas stream flowing through the inlet plenum and exhausting of the cleaned gas stream via the exhaust plenum. This selective regeneration of the filter subassemblies is conducted in situ and provides for sequential regeneration of the multiple subassemblies, thereby preventing any material interruption of the flow of the gas stream through the overall filter system, hence the ability of the overall filter system to accommodate a substantially larger volume of gas flow, and avoiding undesired pressure drop (back pressure) across any one of the multiple filter subassemblies, all without deleterious effects on the normal operation of the generator of the contaminated gas stream, e.g., a diesel engine.

DETAILED DESCRIPTION OF THE INVENTION

Figure 1:
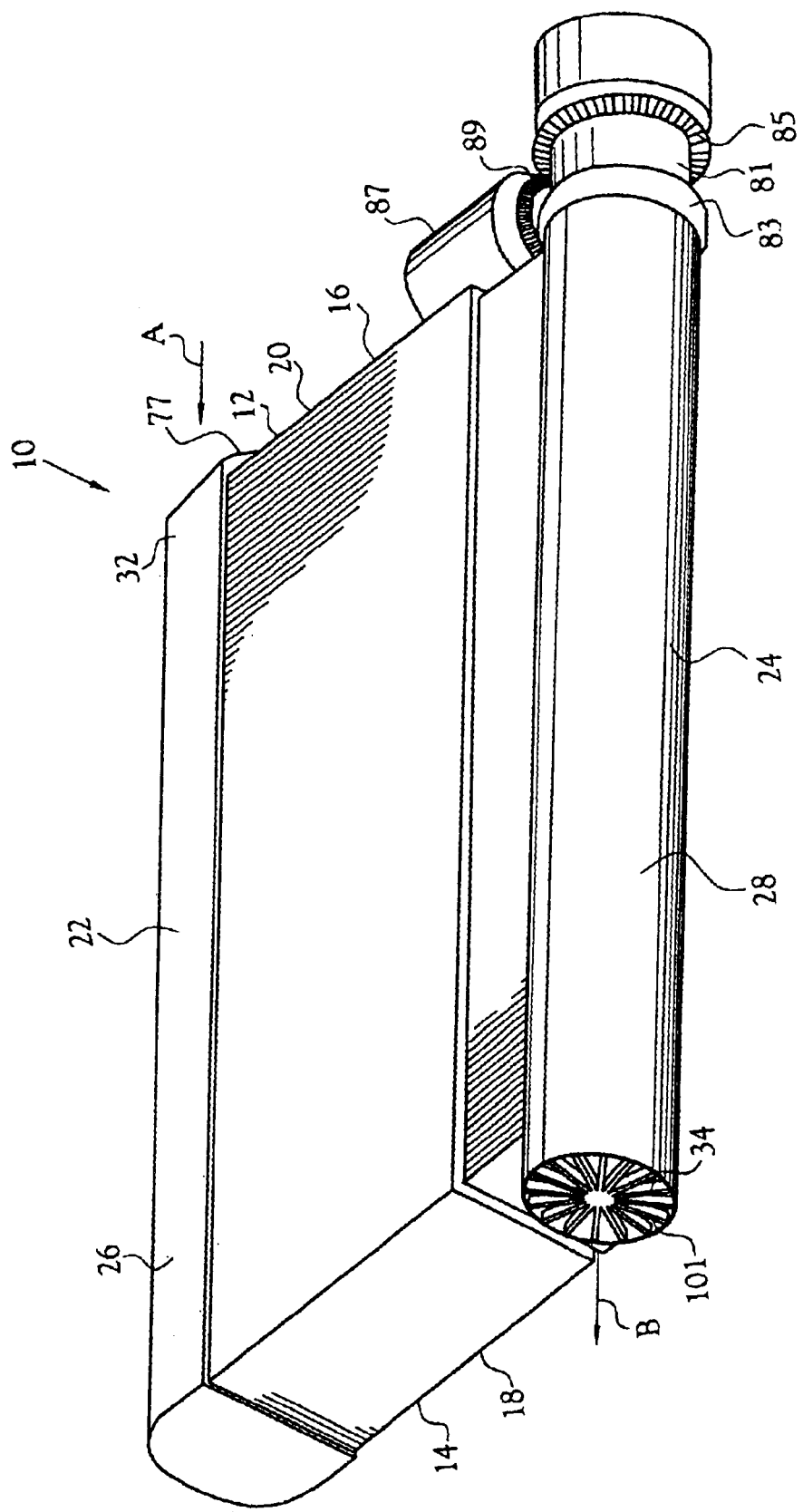
FIG. 1 is a representation of one embodiment of a filter system including various features of the present invention, including multiple stacked filter subassemblies.

Referring specifically to FIG. 1, the depicted embodiment of a filter system 10 of the present invention includes a housing 12, which in the depicted embodiment is of a generally rectangular cross-section having its opposite short sides 14,16 sealed by respective end plates 18,20. Each of the opposite longer sides 22,24 of the housing preferably is rounded and partially defines an inlet plenum 26 and an outlet plenum 28, respectively, for the flow of a gas stream (see arrows) through the filter system.

Figure 2:
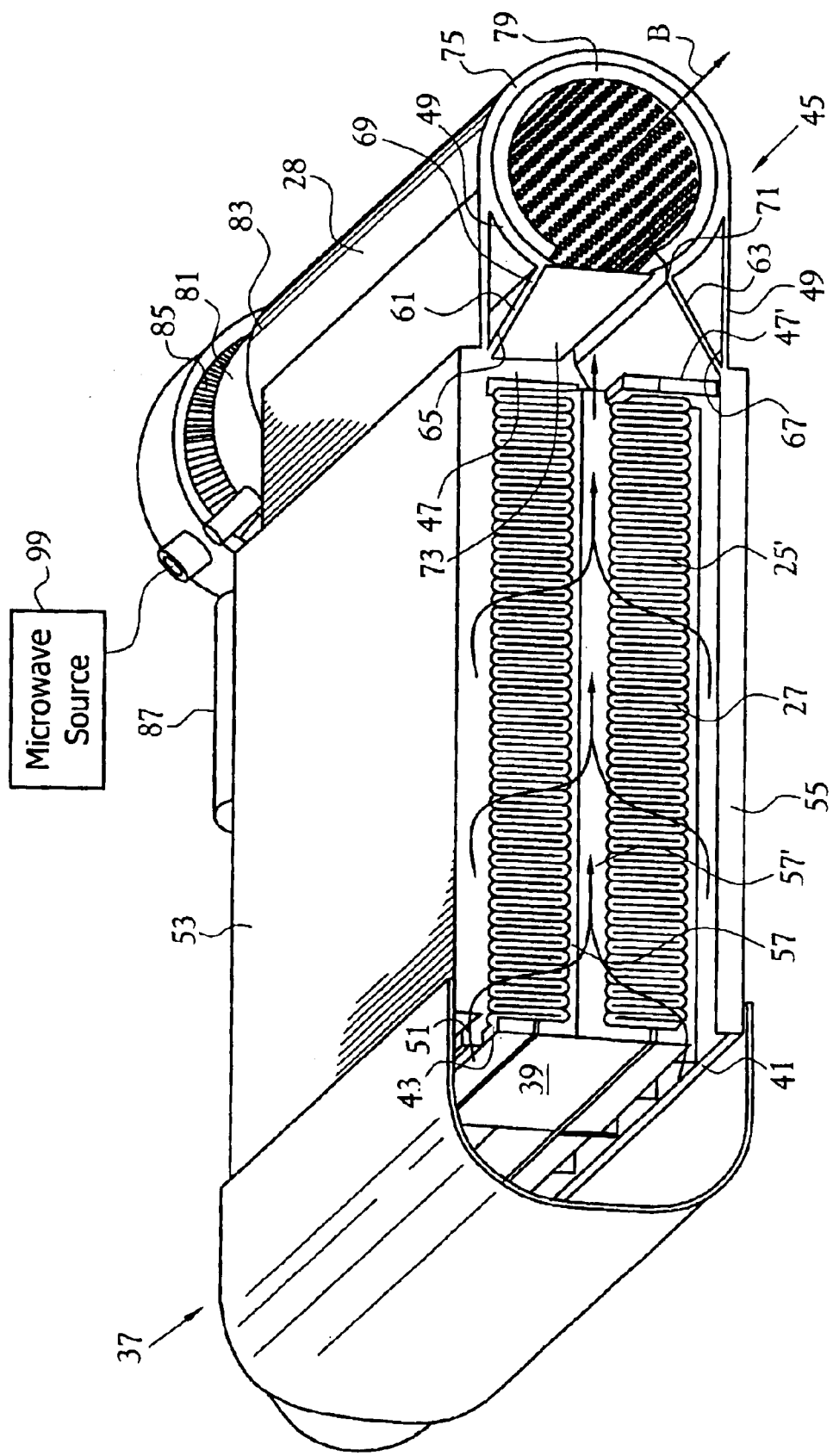
FIG. 2 is a representation of the gas exhaust end of the filter depicted in FIG. 1 and partly cutaway to depict various internal features of the filter.
Figure 3:
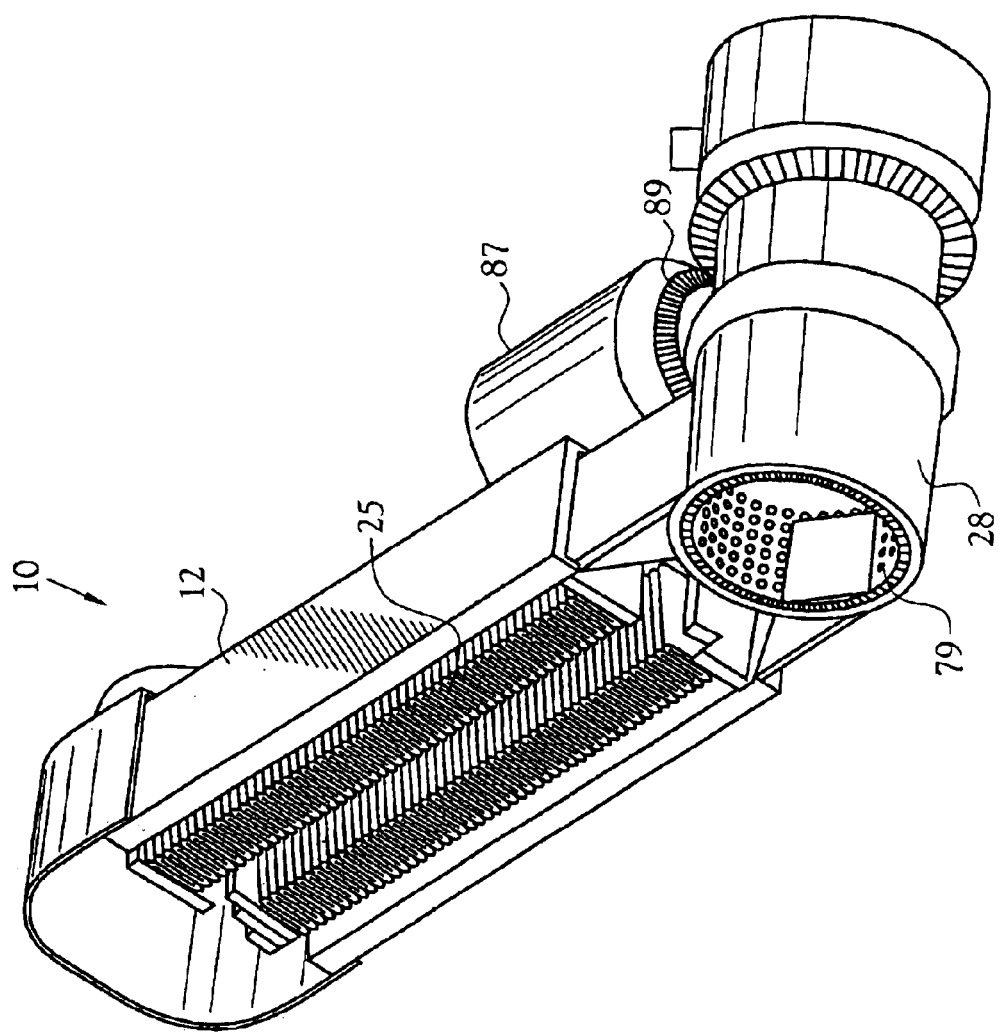
FIG. 3 is a representation, partly cutaway, depicting a filter system including various features of the present invention, including a single filter subassembly.
Figure 5:
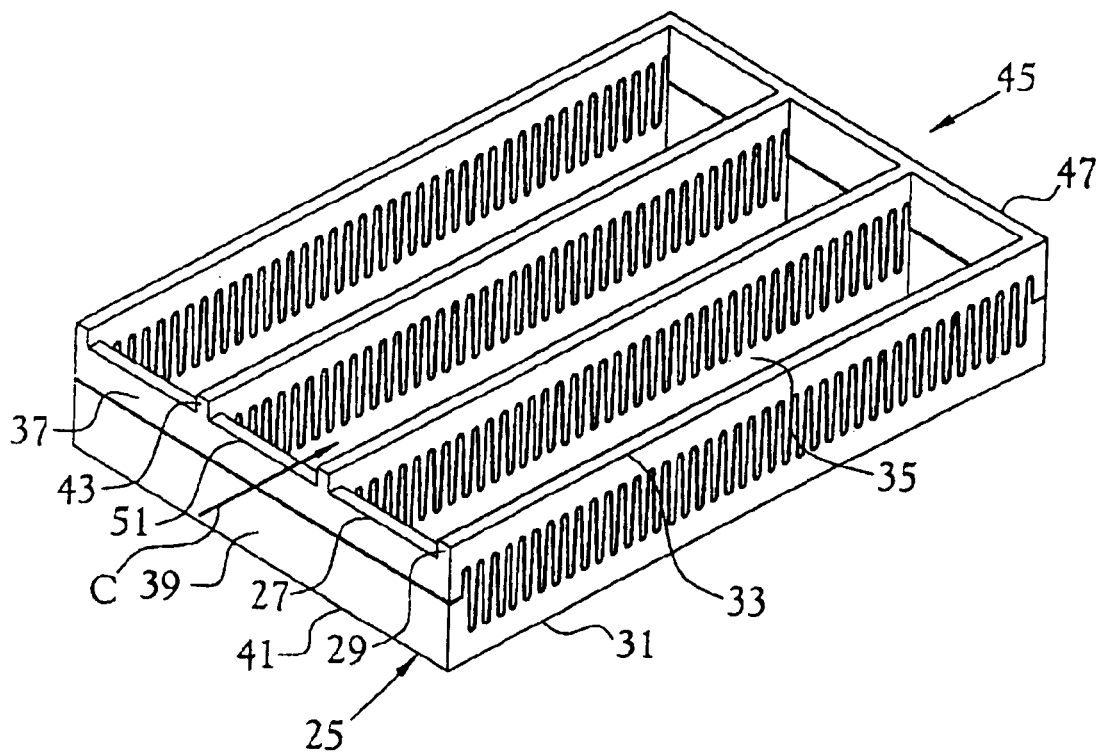
FIG. 5 is a representation of one embodiment of a housing/pleated ceramic fiber paper filter medium module suitable for use in the filter of the present invention; and, FIG. 6 is a exploded view representing a top comb and a bottom comb employed in the disposition of a pleated ceramic-based filter paper within a module of the present system.
Figure 6:
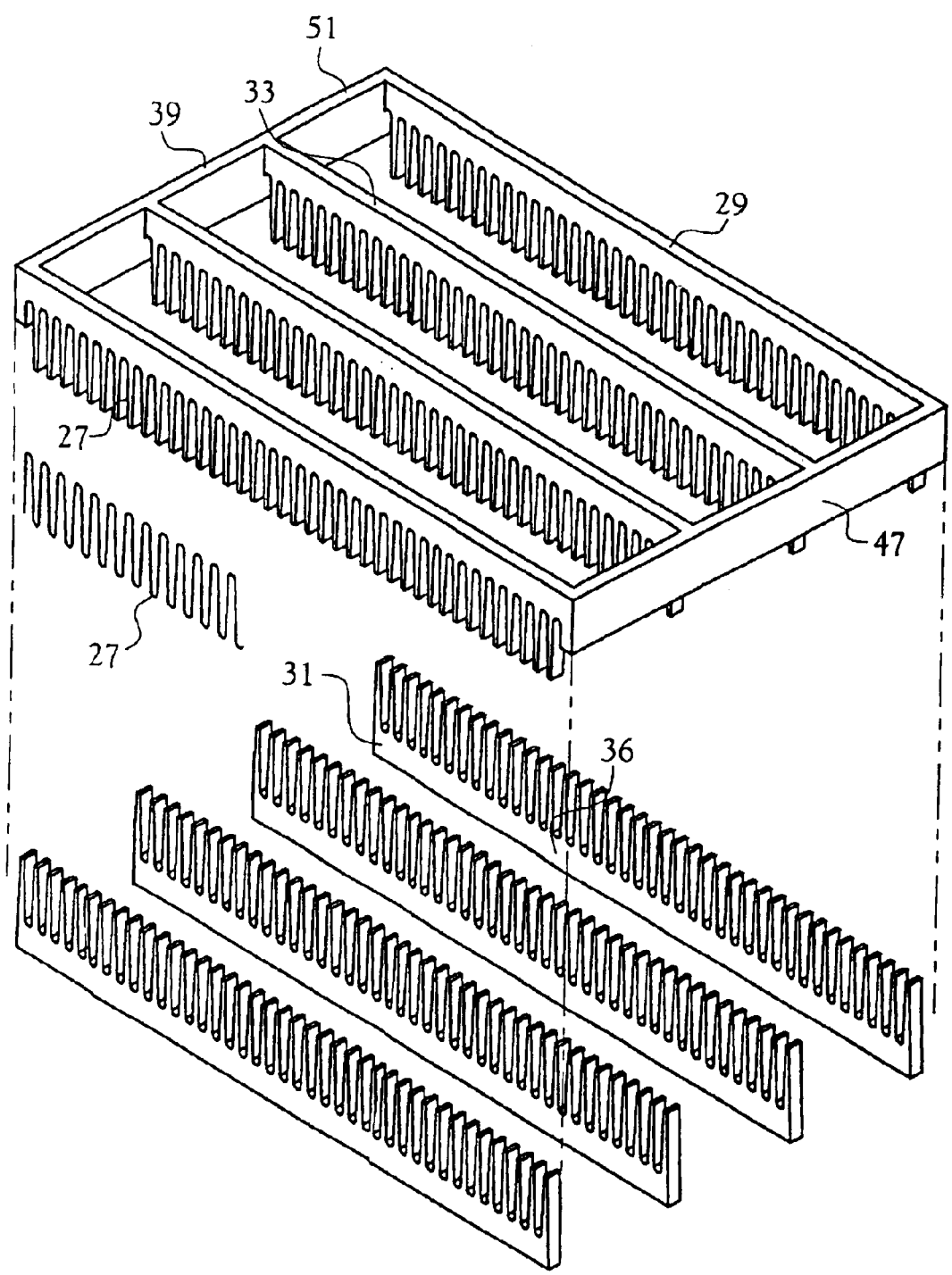

Internally of the housing there is provided at least one, and preferably a plurality of filter modules 25 (see FIG. 5), each of which, in the depicted embodiment includes a pleated ceramic filter paper 27 captured between first and second comb elements 29,31 (typical), respectively, (see FIGS. 6 and 7). As seen in FIGS. 2 and 5, the top margins (ribs) 33 of each comb projects above the planar level of the pleated paper, thereby defining multiple gas flow channels 35 (typical, see arrow C)along the length of each module. The bottom of each module is of like construction as the top of the module and includes ribs 36 which define flow channels along the bottom of the module, the channels of both the top and bottom of the module being oriented in like directions from the inlet to the outlet end of the module (see FIG. 2).

The inlet end 37 of each module is closed by a gas impermeable wall 39 which extends from the bottom edge 41 of the inlet end of the module to a location short of the top portion 43 of each comb rib. The exhaust end 45 of each module includes an end wall 47 which extends from a height equal to the height of the ribs and extends from the rib height to terminate short of the bottom edge 49 of the module (See FIG. 2) thereby leaving an open space 51 at the inlet ends of the top flow channels and closure of the outlet ends of the top flow channels. The top and bottom of each module is overlaid by top and bottom panels 53,55, respectively, of the housing, such panels being overlaid and sealed to the top surfaces of the ribs of the top and bottom of the module, respectively.

Referring to FIG. 6, one embodiment of a filter module includes a first plurality of top combs 29 whose opposite ends are secured to end walls 39 and 47 and a second plurality of bottom combs 31 which are designed such that the teeth of the bottom combs mesh between the teeth of the top combs to capture therebetween a pleated sheet of ceramic fiber-based filter paper 27.

In FIG. 2, there are depicted two stacked modules 25,25', the stack being formed by the placement of the bottom 57 of the upper module 25 in overlying relationship to bottom 57' of the lower module 25', with the bottom ribs of the top module abutting respective ones of the ribs of the bottom ribs of the bottom module of the stack, thereby defining a plurality of planar flow channels 41 between the two overlying bottoms of the modules.

At the exhaust end of the flow channels 41 of the stacked modules of FIG. 2, there are provided first and second obliquely converging elongated panels 61,63 which extend along the full dimension of the exhaust ends of the stacked modules. One side 65 of the first panel 61 is secured to the end wall 47 of the top module 25 and one side 67 of the second panel 63 is secured to the end wall 47' of the bottom module 25'. The opposite sides 69,71 of the converging panels are joined to one another by a porous ceramic microwave permeable wall 73. This wall, in turn, is mounted within a slot in a tubular wall which extends along the length of the exhaust plenum of the housing.

In the depicted embodiment of FIG. 1, the filter system further includes an inlet 77 at a first end 32 of the inlet plenum 26, an outlet 34 at a first end of the outlet plenum 28, and a hollow tubular microwave barrier 79 disposed internally of, concentric with, and extending along at least substantially the length dimension of the outlet plenum 28 and with a portion 81 thereof projecting beyond a second end 83 of the outlet plenum. This tubular barrier is rotatably mounted within the outlet plenum and is provided at its outboard portion 81 with a first ring gear 85 which encircles the tubular barrier. An indexing motor 87 is mounted to the housing and includes a driven shaft which carries a second ring gear 89 thereon, the teeth of the second ring gear 89 meshing with the teeth of the first ring gear whereby activation of the motor functions to rotate the tubular barrier about its longitudinal axis within the outlet plenum, as desired.

Figure 4:
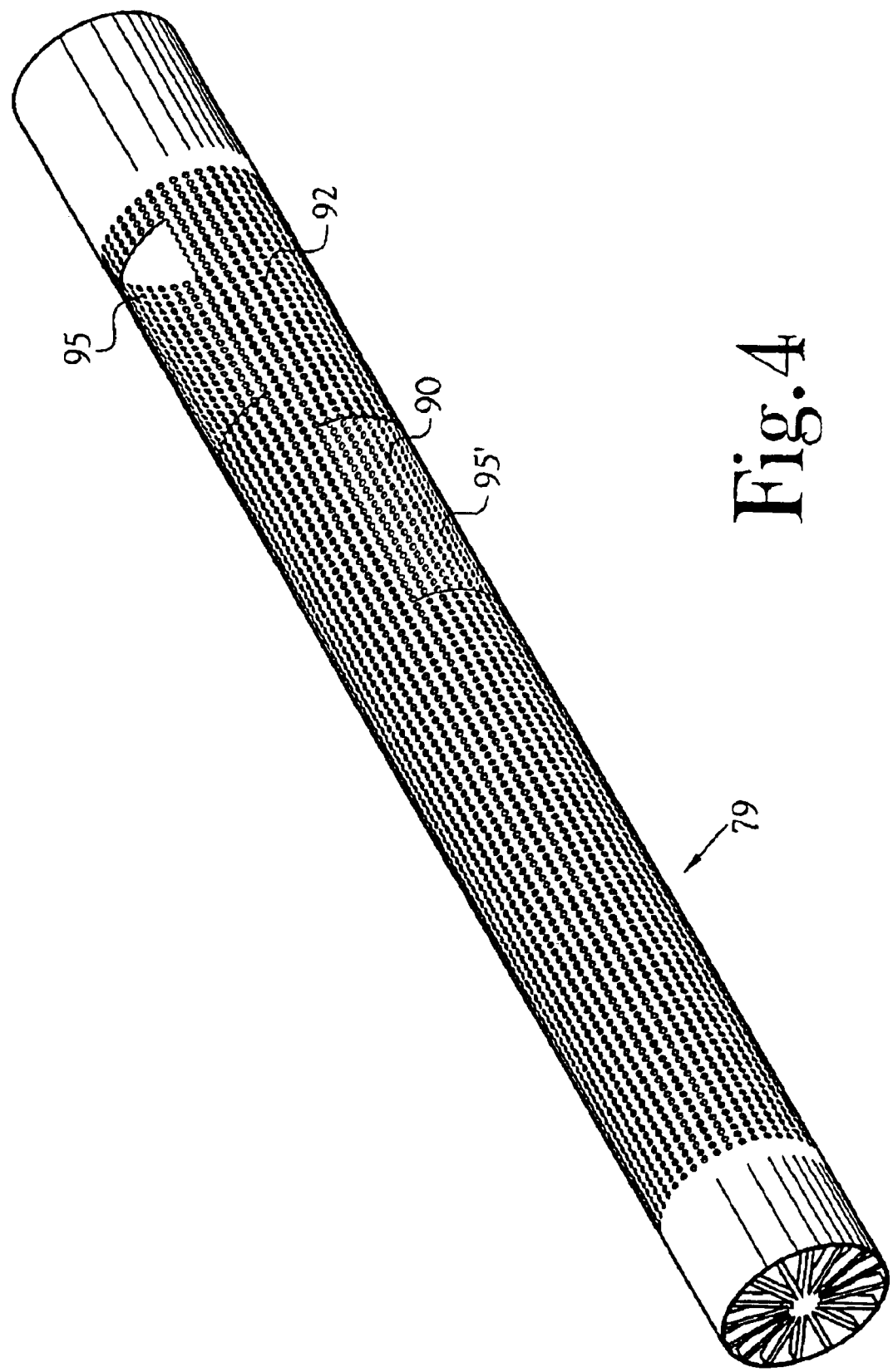
FIG. 4 is representation of an elongated tubular member for rotatable disposition within the exhaust plenum of the filter depicted in FIG. 1.

As seen in FIG. 4, at least one, and most commonly a plurality of cutouts 90 through the wall 92 of the tubular barrier 79 are provided to define one or more outlet ports 95,95' for the movement through such cutout(s) of microwaves from within the internal volume of the hollow tubular barrier.

Referring specifically to FIGS. 1 and 2, microwaves are introduced from a source 99 thereof, into the end of the hollow tubular microwave barrier 79, and move along the length of the tubular barrier toward the exhaust port. As required, a microwave barrier 101 may be provided adjacent the exhaust port to preclude the passage of microwaves out through the exhaust port. Thus the microwaves are contained within the exhaust plenum except in the instance where a port 95, 95' through the wall of the tubular barrier is in register with the ceramic wall 71 adjacent the exhaust ends of the stacked modules. In this latter situation, microwaves move from the exhaust plenum, through the ceramic wall and into the modules.

In the operation of filter system of the present invention, a gas stream bearing volatilizable particulates is directed into the filter system via the inlet and into the inlet plenum. This gas stream is distributed by the plenum into the inlet ends of the flow channels of both the top and bottom modules, hence along the exposed surfaces of the multiplicity of pleats of the ceramic-based filter paper. (see arrows in FIG. 2 indicating gas flow). The gas passes through the filter paper with the particulates in the gas stream being captured on the exposed surfaces of the pleats. The cleaned gas thereupon flows along the exhaust flow channels defined between the overlying bottoms of the modules, through the ceramic wall, thence out through the exhaust port of the exhaust plenum.

In a preferred embodiment, as indicated by the dashed lines 103,103' of FIG. 1, a plurality of stacked modules are ganged together are served by a common inlet plenum and a common exhaust plenum. In this embodiment, the length of the tubular microwave barrier is sufficient to include a cutout through its wall at multiple locations along the length of the barrier, a given cutout being spaced circumferentially apart from adjacent one or ones of others of the cutouts so that only one or a selected number of the cutouts are in register with their respective modules at any given time. (see FIG. 4). The registration of the cutouts with their respective modules is accomplished by means of the indexing motor operating through the first and second ring gears. In this manner, as desired, one or more than one of the modules are accessed by microwaves and closed to full exhaust flow at any given time, while during this given time, others of the modules are closed off from the microwaves and open to full exhaust flow.

Within those modules which are accessed by the microwaves, the microwaves react with the ceramic-based filter paper to heat the filter paper to the volatilization temperature of the particulate matter captured on the filter paper. The gaseous products from the volatilization of the particulates are swept out the exhaust plenum, thereby regenerating the filter paper in situ. During the time in which one (or more) module is being regenerated, there is no material change in the flow of gas through the others of the ganged modules, hence there is little or no deleterious effect with respect to back pressure, flow capacity, or interruption of the device which is generating the particulate-bearing gas stream.

What is claimed:

1. A filtration system operable at elevated temperatures and regenerateable employing microwave energy comprising a plurality of chambers, each chamber including a filter therein and having a plurality of walls defining a passageway into and out of said chamber for a fluid medium, a microwave-permeable window defined in one wall of each of said chambers, said window being impermeable to the flow of said fluid medium therethrough, a source of microwave energy, means directing microwave energy from said source thereof through said window of each of said chambers and into said chamber for a selected period of time and substantially simultaneously closing off any fluid flow through said chamber during said selected period of time, whereby material captured on a filter within said chamber is converted to a gaseous state.

2. The filtration system of claim 1 wherein said filter comprises a web formed from a plurality of ceramic-based fibers.

3. The filtration system of claim 2 wherein said filter comprises a pleated web.

4. The filtration system of claim 1 wherein said microwave energy is of about 2.45 GH.

5. The filtration system of claim 1 wherein said filter is regenerateable in situ.

* * * * *